United States Patent [19]

McMaster

[11] Patent Number: 5,092,916
[45] Date of Patent: Mar. 3, 1992

[54] GLASS SHEET BENDING APPARATUS WITH THERMALLY STABLE REFERENCE

[75] Inventor: Harold A. McMaster, Perrysburg, Ohio

[73] Assignee: Glasstech, Inc., Perrysburg, Ohio

[21] Appl. No.: 556,129

[22] Filed: Jul. 20, 1990

[51] Int. Cl.[5] ............................................. C03B 23/03
[52] U.S. Cl. ...................................... 65/171; 65/273; 65/287; 65/323
[58] Field of Search .................................. 65/171-173, 65/273, 287, 323

[56] References Cited

U.S. PATENT DOCUMENTS 4,737,182  4/1988  Fecik et al. ............................. 65/323
4,781,745  11/1988  Mumford ................................ 65/323

*Primary Examiner*—Joye L. Woodard
*Attorney, Agent, or Firm*—Brooks & Kushman

[57] ABSTRACT

A glass sheet bending apparatus (10) for bending glass sheets about a thermally stable reference is disclosed as including a mold shuttle (20) having a receptical member (22) providing a thermally stable reference point or center with respect to a glass sheet heating furnace (14) and an upper mold support including pin (62) cooperable with the first receptical member (22) so that a glass sheet can be accurately bent between molds (34, 32) mounted on the mold shuttle (20) and upper mold support (26) respectively. An upper mold support actuator (40) includes a second registering member (42) engaging a first registering member (28) of the upper mold support (26) for raising and lowering the upper mold support (26) and disengaging the upper mold support to allow relative movement between the actuator (40) and upper mold support (26) so that the same thereby realign and engage in a newly established registration during subsequent lifting of the upper mold support (26).

12 Claims, 3 Drawing Sheets

GLASS SHEET BENDING APPARATUS WITH THERMALLY STABLE REFERENCE

TECHNICAL FIELD

This invention relates to glass sheet bending apparatus and particularly to apparatus that is thermally stable and continuously self-aligning during production operations.

BACKGROUND ART

In a conventional glass sheet press bending system, a glass sheet is heated in a glass sheet heating furnace to its bending temperature and deposited onto a first shaping surface of a mold, be it a perimeter ring mold or full face mold, for subsequent bending. Then the heated glass sheet and mold are immediately shuttled to a bending location where a cooperating second shaping surface on another mold is brought into contact with the glass sheet on the first shaping surface to conform the glass sheet to the shape of the shaping surfaces.

The molds are mounted on supports which are movable toward each other along a fixed path by mechanical actuators. As this tooling undergoes expansion due to heating and contraction due to cooling in the bending environment, some relative rotational and/or translational movement occurs between the shaping surfaces of the molds. More specifically, the conventional actuators do not correct the shaping surface alignment between the molds as the tooling is heated and cooled during production bending. Therefore an operator must compensate for mold misalignments during production bending resulting in lost production time.

Furthermore, conventional glass sheet shaping tool changes generally require 7-10 hours of down time to effect a change to a new tool. This entails 3-4 hours of cool down time plus another 2-3 hours of labor time plus 2-3 hours of furnace section heat-up time. This too results in lost production time.

DISCLOSURE OF THE INVENTION

An object of the present invention is to provide a glass sheet bending apparatus that allows a mold actuator and mold to disengage during a portion of each bending cycle to allow the actuator and mold to reengage in a newly established registration to complete the cycle.

Another object of the invention is to provide an apparatus that allows the upper and lower molds to expand or contract around a know point without rotation or translation.

Still another object of the invention is to provide an apparatus that reduces mold changeover time by allowing molds to be changed while hot.

In carrying out the above objects and other objects of the invention, a bending apparatus constructed in accordance with the invention is used in a glass sheet bending system including a glass sheet heating furnace for heating a glass sheet. The furnace includes a furnace frame and a bending section. The bending section includes a topside support device for receiving the glass sheet from a heating conveyor and a lower bending mold assembly for receiving the heated glass sheet from the topside support device.

The bending apparatus includes a mold shuttle having first registration means mounting the lower bending mold assembly. A bender frame is rigidly mounted on the furnace frame. An upper mold support including a first registering member and second registration means is mounted on the upper mold support.

The lower bending mold is movable via the mold shuttle under the upper bending mold for subsequent bending of a glass sheet between the molds. An upper mold support actuator mounted on the bender frame vertically moves the upper mold support. The upper mold support actuator includes a second registering member releasably and adjustably registerable with the first registering member. A drive mechanism moves the upper mold support actuator whereby the upper mold support and lower mold shuttle are accurately registerable via the registration means when the upper mold support is moved toward the lower mold shuttle, registering the shuttle and upper mold support, for bending the glass sheet between the lower and upper molds. The upper mold support actuator disengages the upper mold support by overtraveling downward and disengaging the registering members during the bending allowing relative movement between the actuator and upper mold support and realignment of the upper mold support and support actuator during subsequent lifting of the upper mold support. The disengaging feature of the upper mold support and support lifter also allows the upper mold support to be quickly changed in a hot condition.

Preferably, the bending apparatus includes a stop for supporting the upper mold support in adjustable, spaced apart relationship with the lower mold during bending of the glass sheet between the molds. The first registering member is a male member including a plate in a horizontal orientation having a peripheral edge defined by a plurality of rectangular cut-outs. The second registering member is a female member including an aperture having a peripheral edge in a horizontal orientation defined by a corresponding plurality of rectangular cut-outs. Projections corresponding to the rectangular cut-outs of the first and second registering members cooperate for engagement during lifting of the upper mold support via the upper mold support lifter.

In the preferred embodiment, the first registration means is defined by a receiver and the second registration means is defined by a pin insertable into the receiver for accurate alignment of the mold shuttle and upper mold support when the upper mold support and lower mold shuttle are brought together for the bending. The upper mold support actuator is defined by a tube assembly. A linear bearing mounted on the bender frame mounts the tube assembly and holds the assembly plumb with respect to the furnace frame for precise vertical movement of the upper mold support actuator.

The drive mechanism includes a gear motor and drive shaft mounted on the bender frame and a roller chain connected to the tube assembly for raising and lowering the tube and upper mold support. The bending apparatus also includes a counter-balance for counter-balancing the upper mold support and mold to reduce the load on the drive mechanism, thereby decreasing bending cycle time. Preferably, the counter-balance is a pneumatic cylinder and roller chain connected to the drive shaft.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
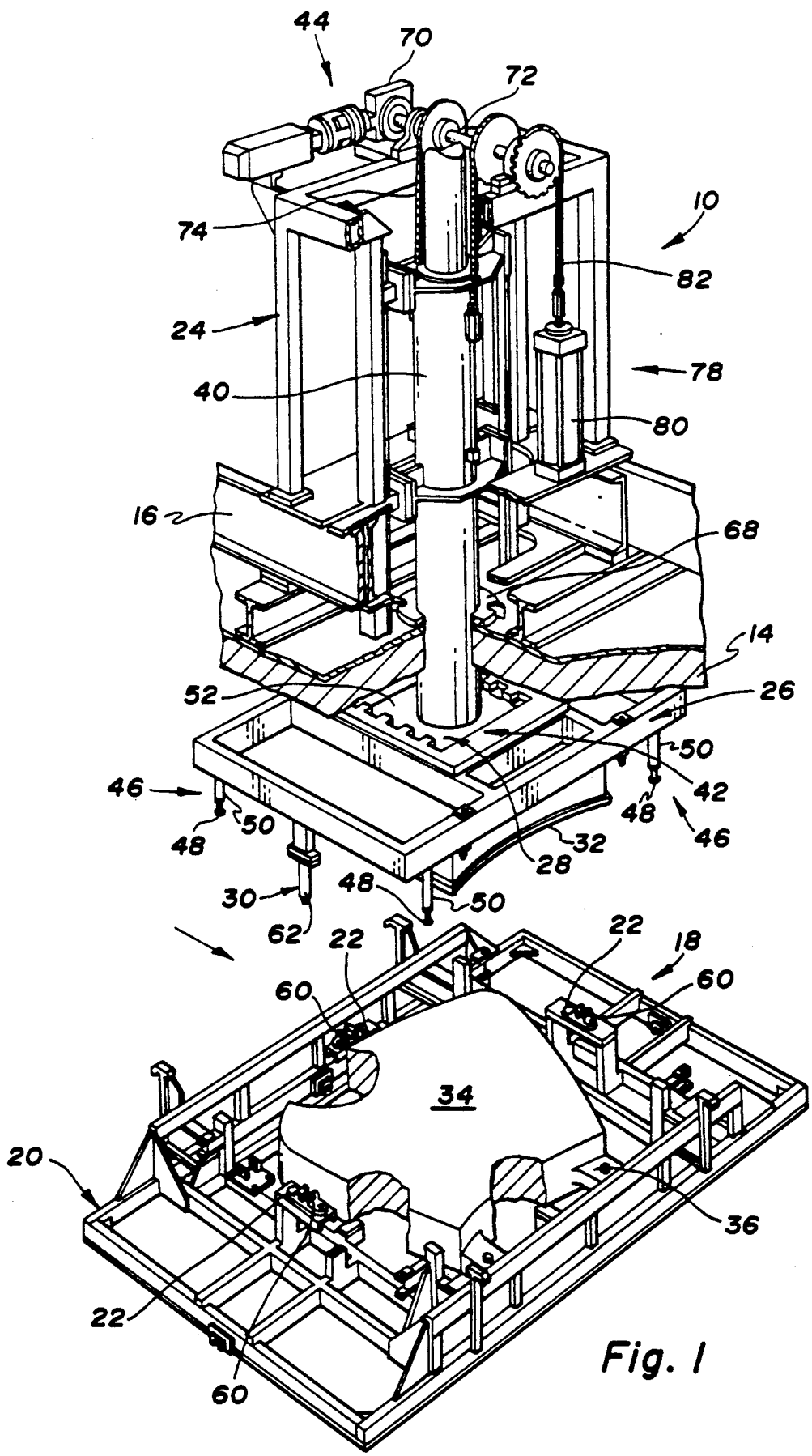
FIG. 1 is a partially sectioned perspective view of a bending apparatus constructed in accordance with the present invention.

Referring to FIG. 1 of the drawings, a bending apparatus constructed in accordance with the present invention is generally indicated by reference numeral 10 and is used to accurately bend a heated glass sheet about a stable thermal reference point. As is hereinafter more fully described, the bending apparatus 10 provides a thermally stable reference point for shape repeatability when bending glass sheets during a production run and it also reduces mold changeover time by allowing molds to be changed while hot.

As shown in FIG. 1 of the drawings, bending apparatus 10 is part of a glass sheet bending system including a glass sheet heating furnace 14 in which a glass sheet is heated to its bending temperature. Furnace 14 includes a furnace frame 16 and a bending section which is partially shown. The bending section includes a topside support device of the type disclosed in U.S. Pat. No. 4,578,103, but not shown, and a lower bending mold assembly 18 for receiving a heated glass sheet from such a topside support device.

The bending apparatus 10 shown includes a mold shuttle 20 having first registration means 22 and mounting the lower mold assembly 18 thereon for movement between the topside support device and bending apparatus. A bender frame 24 is rigidly mounted on the furnace frame 16 and is situated in the ambient environment above the furnace 14. Preferably, bender frame 24 is a frame comprised of structured steel and suitable fasteners. An upper mold support 26 connected to bender frame 24 includes a first registering member 28 and a second registration means 30. An upper bending mold 32 is mounted on the upper mold support 26 for movement with the upper mold support. The lower bending mold assembly includes a lower mold 34 and lower mold support 36 movable via the mold shuttle 20 to a position under the upper bending mold 32 for subsequent bending of the glass sheet between the upper and lower bending molds.

Figure 2:
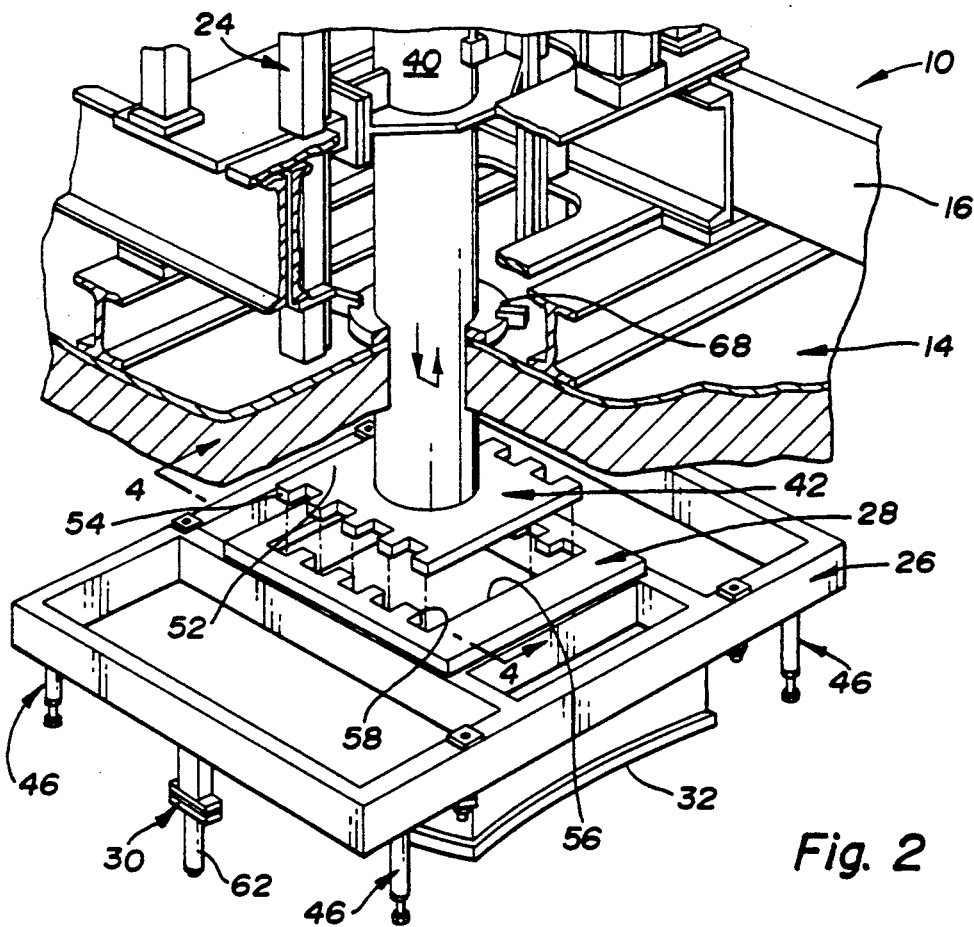
FIG. 2 is a partially sectioned perspective view of an upper mold support and upper mold support actuator illustrating disengaging registering members in a pre-assembled condition.
Figure 3:
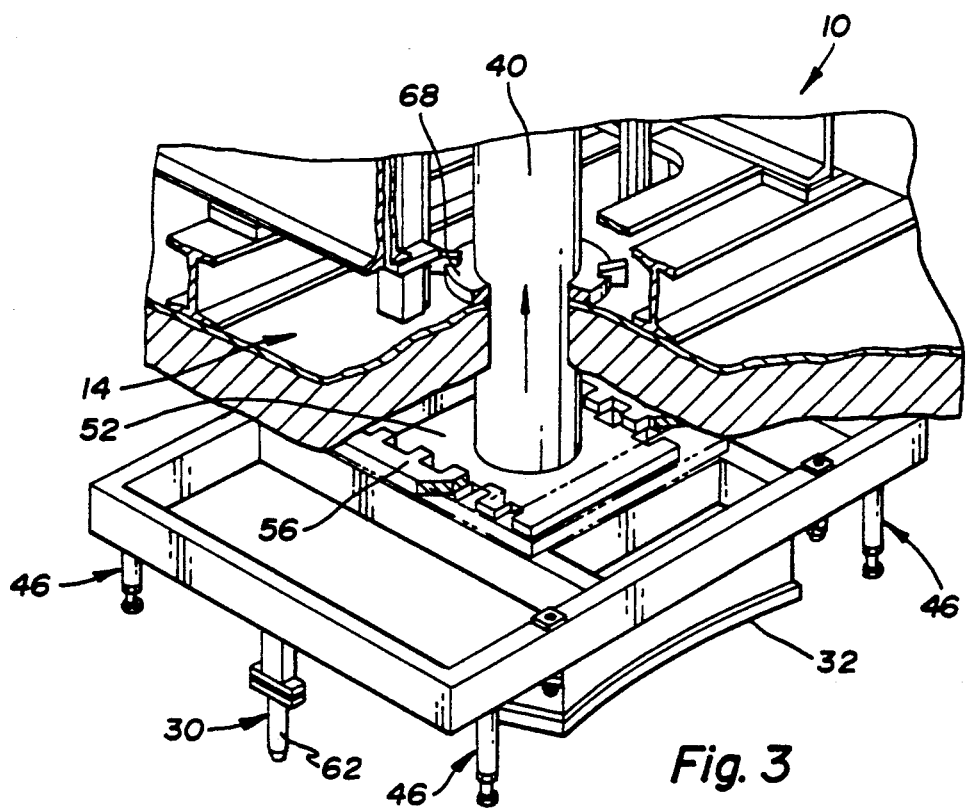
FIG. 3 is a partially sectioned view of the upper mold support and upper mold support actuator in an engaged arrangement of the registering members.

With continued reference to FIG. 1 and with reference to FIGS. 2 and 3 of the drawings, an upper mold support actuator 40 is mounted on the bender frame 24 for vertically moving the upper mold support 26 and upper bending mold 32. The upper mold support actuator 40 includes a second registering member 42 releasably and adjustably registerable with the first registering member 28 of the upper mold support 26.

A drive mechanism 44, seen in FIG. 1, moves the upper mold support actuator 40 upwardly and downwardly during operation of the bending apparatus 10.

The upper mold support 26 and lower mold shuttle 20 are accurately registerable together via the registration means 22,30 when the upper mold support 26 is moved relatively toward the lower mold shuttle 20 and the registration means engage for bending of the glass sheet between the lower and upper molds 34,32.

Figure 4A:
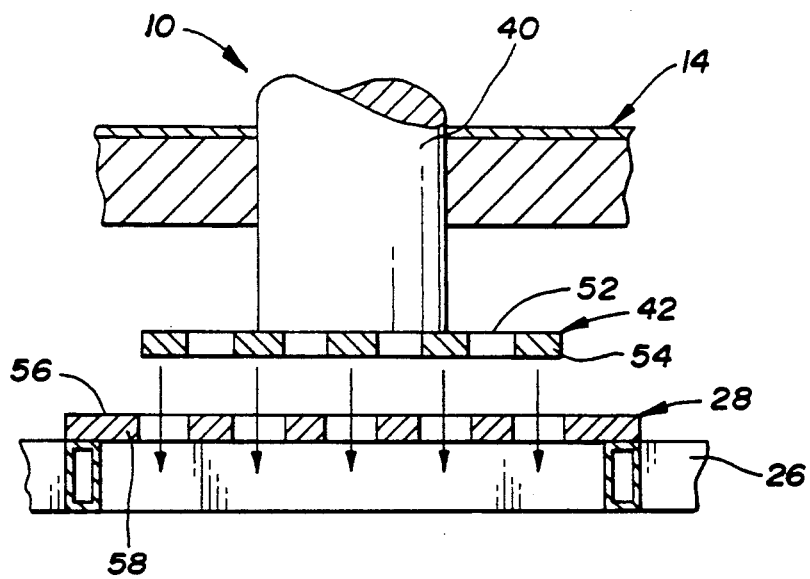
FIGS. 4a through 4c are sectional elevational views of the registering members illustrating the disengaging feature of the registering members that allows for re-alignment and quickly changing tooling.
Figure 4B:
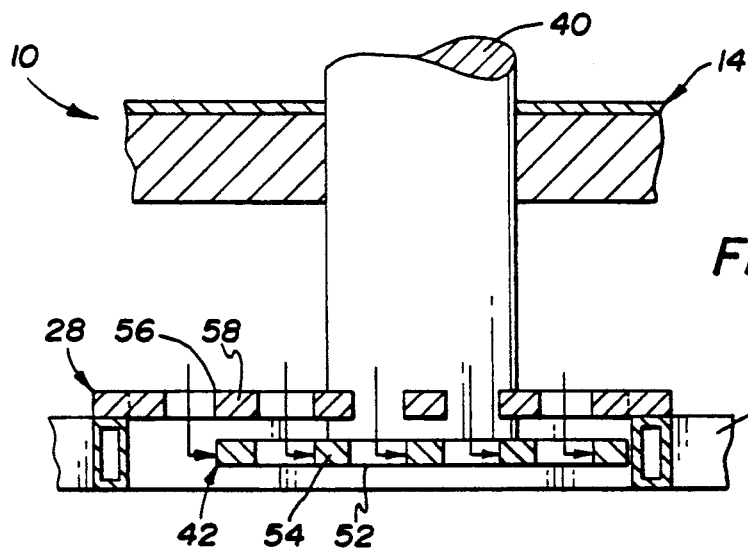
Figure 4C:
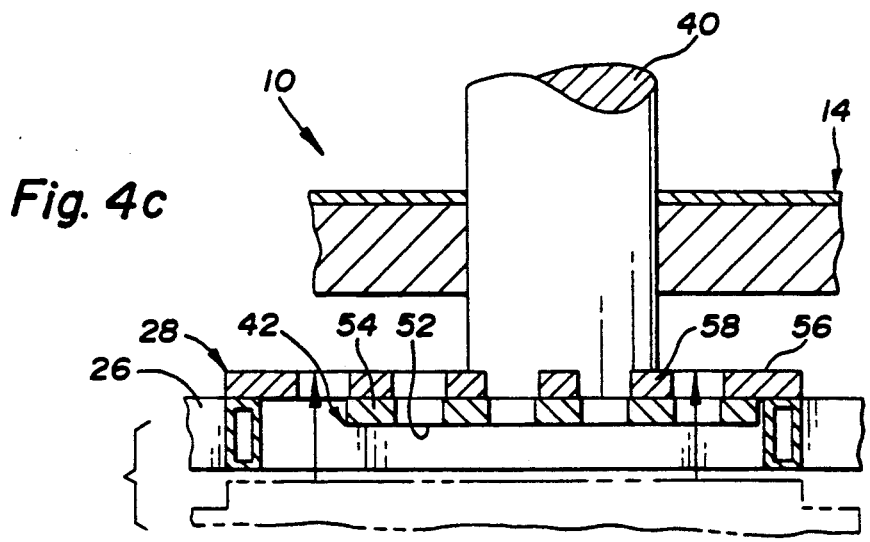

During the bending, upper mold support actuator 40 disengages the upper mold support 26 as actuator 44 moves the support lifter downwardly such that second registering member 42 disengages with the first registering member 28 as the upper mold support 26 is supported by mold shuttle 20, see FIG. 4b. This disengagement allows the upper mold support 26 and lower mold shuttle 20 to be accurately aligned by the registration means 22,30 and also allows realignment of the upper mold support and support lifter if necessary during subsequent separation of the upper mold support and mold shuttle 20. The disengaging feature of the registration means 22,30 allows the upper mold support 26 to be quickly changed as the upper mold support and support lifter are easily disengaged. Another mold support is likewise easily mounted on the upper mold support actuator 40.

As shown in FIGS. 1-3 of the drawings, bending apparatus 10 includes a plurality of stops 46 illustrated as bolts 48 mounted on vertical extensions 50 extending from the upper mold support 26 for supporting the upper mold support in adjustable, spaced apart relationship with the mold shuttle 20 during bending of the glass sheet between the molds 34,32 and allowing for the disengaging of the actuator 40 and upper mold support. The second registering member 42 is a male member including a plate 52 in a horizontal orientation having a peripheral edge 54 defined by a plurality of rectangular cut-outs. The first registering member 28 is a female member including an aperture 56 having a peripheral edge 58 in a horizontal orientation defined by a corresponding plurality of rectangular cut-outs cooperable with the rectangular cut-outs of the first registering member 28 for engagement of the projections corresponding to the rectangular cut-outs during lifting of the upper mold support 26. As illustrated, the upper mold support 26 is mounted on the support actuator 40 by alternately aligning the cut-out peripheral edges and projections of the registering members 28,42 passing the members past one another and shifting the upper mold support the width of a cut-out so that the cut-outs align for engagement of the projections during subsequent relative vertical movement.

Referring again to FIG. 1 of the drawings, the first registration means 22 is defined by a receptical member that includes spaced rollers 60. The second registration means 30 is defined by a pin 62 insertable into the space between rollers 60 for rolling engagement therewith to provide accurate alignment of the mold shuttle 20 and upper mold support 26 during the glass sheet bending unrestricted by the previous engagement of the first and second registering members 28,42. Registration of this type is disclosed in U.S. Pat. No. 4,781,745 and in the arrangement shown any thermal expansion or contractions of the tooling occur radially relative to the thermal center which remains unaffected.

In the preferred embodiment of the invention, upper mold support actuator 40 is a tube assembly that is guided by a linear bearing 68 mounted on furnace frame 16 and holding the tube assembly plumb with respect to the furnace frame for precise vertical movement. Drive mechanism 44 includes a gear motor 70 and drive shaft 72 mounted on the bender frame 24 and a roller chain 74 connected to the tube assembly for raising and lowering the tube assembly and upper mold support 26. A counter-balance 78 defined by a pneumatic cylinder 80 and lower chain 82 is connected to drive shaft 72 to counterbalance the upper mold support 26 and upper mold 32.

While the best mode for carrying out the invention has been described in detail, those familiar with the art to which this invention relates will recognize various alternative designs and embodiments for practicing the invention as defined by the following claims.

What is claimed is:

1. In a glass sheet bending system including a glass sheet heating furnace for heating a glass sheet, the furnace including a furnace frame and a bending section; the bending section including a bending mold assembly including a lower bending mold for receiving a heated glass sheet, said bending assembly comprising:

a mold shuttle having first registration means and mounting the lower bending mold;
   a bender frame rigidly mounted on the furnace frame;
   an upper mold support including a first registering member; said upper mold support also including second registration means; said upper mold support being supportable on said mold shuttle;
   an upper bending mold mounted on said upper mold support, the lower bending mold being movable via the mold shuttle under the upper bending mold for subsequent bending of the glass sheet;
   an upper mold support actuator mounted on said bender frame for vertically moving said upper mold support; said upper mold support actuator also including a second registering member releasably and adjustably registerable with said first registering member for supporting said upper mold support during vertical movement; and
   a drive mechanism for moving said upper mold support actuator whereby said upper mold support and the lower mold shuttle are accurately aligned together via said registration means when said upper mold support is moved toward the lower mold shuttle for bending of the glass sheet between the lower and upper molds, and said upper mold support actuator disengaging said upper mold support therefrom during the bending thereby allowing relative movement between said upper mold support and support actuator realigning the same for subsequent lifting and also allowing the upper mold support to be quickly changed in a hot condition.

2. Apparatus as in claim 1 including a stop means mounted on the upper mold support for supporting the upper mold support in adjustable, spaced apart relationship with the mold shuttle during bending of the glass sheet between the molds.

3. Apparatus as in claim 2 wherein said first registering member is a male member including a plate in a horizontal orientation having a peripheral edge defined by a plurality of rectangular cut outs.

4. Apparatus as in claim 3 wherein said second registering member is a female member including an aperture having a peripheral edge in a horizontal orientation defined by a corresponding plurality of rectangular cut-outs cooperable with said rectangular cut outs of said first registering member for engagement therewith during lifting of said upper mold support.

5. Apparatus as in claim 4 wherein said first registration means is defined by a receptical member.

6. Apparatus as in claim 5 wherein said second registration means is defined by a pin insertable into said receptical member for accurate alignment of said mold shuttle and upper mold support.

7. Apparatus as in claim 6 wherein said upper mold support actuator is a tube assembly including a tube.

8. Apparatus as in claim 7 further including a linear bearing mounted on the furnace frame holding said tube plumb with respect to the furnace frame for precise vertical movement.

9. Apparatus as in claim 8 wherein said drive mechanism includes a gear motor and drive shaft mounted on said bender frame and a roller chain connected to said tube for raising and lowering said tube and thereby the upper mold support.

10. Apparatus as in claim 9 further including a counterbalance connected to said tube assembly for counterbalancing the weight of said tube, upper mold support and upper mold.

11. Apparatus as in claim 10 wherein said counterbalance is a pneumatic cylinder and roller chain connected to said drive shaft.

12. In a glass sheet bending system including a glass sheet heating furnace for heating a glass sheet, the furnace including a furnace frame and a bending section; the bending section including a bending mold assembly including a lower bending mold for receiving a heated glass sheet, said bending assembly comprising:

a mold shuttle movable with respect to the furnace frame having first registration means and mounting the lower bending mold;
   a bender frame rigidly mounted on the furnace frame;
   an upper mold support including a first registering member; said upper mold support also including second registration means; said upper mold support being supportable on said mold shuttle;
   an upper bending mold mounted on said upper mold support, the lower bending mold being movable via the mold shuttle under the upper bending mold for subsequent bending of the glass sheet;
   a horizontally constrained tubular upper mold support actuator assembly mounted on said bender frame for vertically moving said upper mold support; said upper mold support actuator also including a second registering member releasably and adjustably registerable with said first registering member for supporting said upper mold support during vertical movement; and
   a drive mechanism for moving said upper mold support actuator whereby said upper mold support and the lower mold shuttle are accurately aligned together via said registration means when said upper mold support is moved toward the lower mold shuttle for bending of the glass sheet between the lower and upper molds, and said upper mold support actuator disengaging said upper mold support therefrom as the upper mold support actuator overtravels in a downward direction during the bending thereby allowing relative movement between said upper mold support and support actuator realigning the same for subsequent lifting of said upper mold support and also allowing the upper mold support to be quickly changed in a hot condition.

* * * * *